United States Patent [19]

McGahan

[11] Patent Number: 4,509,853

[45] Date of Patent: Apr. 9, 1985

[54] SYSTEMATIC COLOR REFERENCE

[76] Inventor: Mark J. McGahan, 625 El Dorado Ave., Oakland, Calif. 94611

[21] Appl. No.: 446,097

[22] Filed: Dec. 2, 1982

[51] Int. Cl.³ ............................................. G03B 27/72
[52] U.S. Cl. .................................................... 355/35
[58] Field of Search ........................... 355/32, 35, 88; 350/317, 311, 314, 320; 353/20; 430/355, 369, 494

[56] References Cited

U.S. PATENT DOCUMENTS

| | | | |
|---|---|---|---|
| 3,685,900 | 8/1972 | Kirby et al. | 355/32 |
| 3,923,388 | 12/1975 | Shenker | 353/20 |
| 3,967,897 | 7/1976 | Rogers | 355/32 |
| 4,087,180 | 5/1978 | DiNatale | 355/77 |
| 4,092,067 | 5/1978 | Grossman | 355/77 |
| 4,154,523 | 5/1979 | Rising et al. | 355/38 |
| 4,167,327 | 9/1979 | DiNatale | 355/77 |
| 4,174,173 | 11/1977 | Poné, Jr. | 355/38 |
| 4,274,732 | 6/1981 | Thurm et al. | 355/38 |
| 4,294,900 | 10/1981 | Aono | 350/317 |
| 4,410,613 | 10/1983 | Soskuthy | 355/35 |

Primary Examiner—Richard A. Wintercorn
Assistant Examiner—Brian W. Brown

[57] ABSTRACT

A systematic color reference for standardized graphic transparency color generation and color matching. A color palette matrix has a plurality of transparencies arranged in row and columns. The matrix provides a hue shift axis in which hue or color is progressively shifted from a primary color to a secondary color. A value shift matrix axis is provided wherein light density of the hue is progressively shifted from a lighter density to a darker density. A unique code is established for each matrix location such that a color selected from the matrix may be readily reproduced on standard equipment.

10 Claims, 5 Drawing Figures

U.S. Patent  Apr. 9, 1985  4,509,853
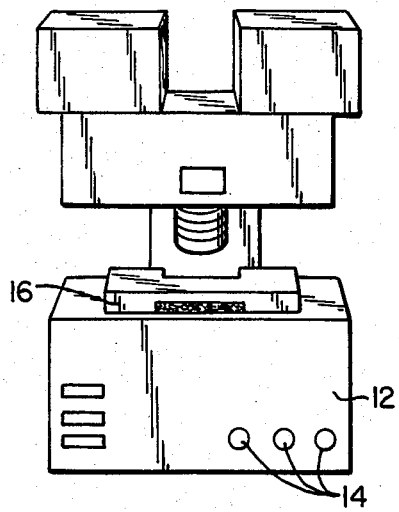
FIG._1.
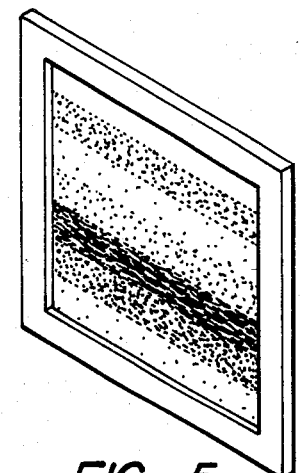
FIG._5.
COLON GENERATION CODE
| 1 | 8 | Y2 | 40M | PF 2 |
|---|---|----|-----|------|
| A | B | CD | xxE | pfG  |
FIG._4.
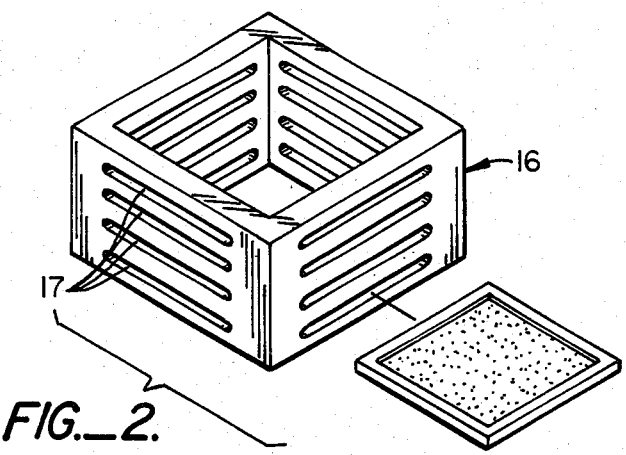
FIG._2.
| PRE-FLASH | -.60 | PF 2 | | | | | | 1/ |
|---|---|---|---|---|---|---|---|---|
| PRE-FLASH | -.90 | PF 3 | | | | | | 2 |
| | 0 | C | +20 | +40 | +80 | +120 | +160 | 3 |
| | .30 | +1 | | | | | | 4 |
| | .60 | +2 | | | | | | 5 |
| | .90 | +3 | | | | | | 6 |
| | ROW | A | B | C | D | E | F | |
FIG._3.

SYSTEMATIC COLOR REFERENCE

TECHNICAL FIELD

My invention relates to photography. More particularly, my invention relates to a method and apparatus for graphic transparency color matching and color selection.

BACKGROUND OF THE INVENTION

A picture is worth a thousand words. It is therefore no surprise that graphic transparencies are an important part of many presentations. In business, graphic transparencies provide speaker support in the form of a slide presentation; in education, they present concepts as readily grasped images; in entertainment, they compliment the entertainer and increase the pleasure of the performance to the audience.

Graphic transparencies are most effective when produced in an imaginative and professional manner. Color range should be extensive, backgrounds should match where appropriate. To this end, graphic transparency production laboratories should offer accurate color matching and a wide range of colors to choose from.

Graphic transparency production laboratories typically use one or more of several approaches to matching and/or selecting color. The approaches vary with the sophistication of the particular laboratory. Most laboratories offer a color range of less than 50 different colors. The colors offered are seldom relative to each other.

The limited number of available colors, coupled with the lack of logical color standard organization, reduces the options the laboratory may offer its customers. As a result, the photographic arts suffer. In the context of graphic color slides, most processing laboratories are severely lacking in color theory expertise. There is no practical didactic in color transparency theory, especially its application to graphic slide production.

Although there are several sophisticated devices available to the color transparency processing laboratory, ultimately filters of varying colors and densities are used for selecting or matching colors. The most basic method of selecting the proper filtering is the trial and error method. This method consumes a great deal of camera time, as well as a large quantity of printing medium.

Computer generated graphics systems can produce an unlimited variety of color, yet most such systems offer a standard selection of less than 100 colors. Recent developments in microelectronics have resulted in the marketing of computer controlled color heads, but there is still no logical device or method by which a laboratory operator can match or select a wide range of colors.

Although filters of various colors and densities are known to be useful for correction of color cast; the art sorely lacks any rapid and logical color reference selecting and matching method or device. There is no color reference allowing quick selection and accurate matching of a wide range of colors. This is especially true where reference colors should be easily and reliably obtained on standard processing equipment such that the laboratory operator can offer his customers the widest range of colors possible at the most reasonable cost. The availability of such a reference system would allow the photographic and graphic transparency arts to continue to provide unlimited opportunity for artistic expression and technical excellence.

SUMMARY OF THE INVENTION

My invention is a systematic color reference for standardized color generation and color matching. Such a system is particularly useful in the graphic transparency arts where a designer may choose to have a large palette of colors available either for original art work or for matching pieces of work in a series to a common background color.

My invention includes a series of color palette matrices having a plurality of transparencies arranged in rows and columns. Each matrix has a hue shift axis in which hue or color is progressively shifted from a primary color toward a secondary color. The matrix also includes a value shift axis wherein the value of the hue is progressively shifted from a lighter density to a darker density.

Each location in the color palette matrix has a designation from which hue shift axis and value shift axis values may be determined. A unique code is included by which any color in the matrix may be produced for color matching or for color generation and by which is provided: exposure time, aperture setting, the primary color filter, stops of neutral density, amount of hue shift from the primary color, and a second primary color with which the primary color is mixed to shift the hue toward the secondary color. A feature of my invention is the incorporation of a preflash and preflash value into the color generation code to extend the range of color density available and provide greater dynamic color range. Another feature of my invention is the inclusion of several basic colors over-printed onto each color palette matrix transparency to provide contrast and color interaction information to the designer.

BRIEF DESCRIPTION OF THE DRAWINGS

My invention is best understood by referring to the specification and the following drawings, in which:

FIG. 1 is schematic representation of a graphic printing system incorporating a filter matrix, according to my invention;

FIG. 2 is a perspective view of a filter matrix, according to my invention;

FIG. 3 is a typical slide palette matrix, according to my invention;

FIG. 4 is an example of a color generation code, according to my invention; and

FIG. 5 is an example of color overprinting, according to my invention.

DETAILED DESCRIPTION OF A PREFERRED EMBODIMENT

My invention provides a method and apparatus for graphic transparency color matching and color selection wherein a color palette matrix provides systematic color selection. Each individual color in the color palette matrix may be reproduced with a filter array according to unique values provided with the system for each color.

One embodiment of my invention provides a slide palette matrix that includes a plurality of transparencies that are arranged in rows and columns (FIG. 3). In an exemplary embodiment of my invention, the slide palette matrix consists of six rows and six columns. The matrix has a hue shift axis, shown as the horizontal axis in FIG. 3; and a value shift axis, shown as the vertical axis in FIG. 3.

The hue shift axis provides a progressive shift from a primary color toward a secondary color. The present invention contemplates a color generation scheme based on the three primary colors: yellow, cyan, and magenta. It is possible to provide a similar color generation scheme based on the three primary colors: red, blue, and green. Referring to the color generation code shown in FIG. 4 the letter "Y" refers to yellow and the "2" following it refers to two F stops of neutral density (0.60 neutral density).

In the above example, yellow is the primary color. The "M" in FIG. 4 refers to magenta, the color with which the primary color is being mixed. The "40" refers to the amount of magenta being mixed with the primary color. In this embodiment, the "40" refers to a unit of color correction on a scale graded from "0" to "180", as with a dialable dichroic filter system. Such filter systems are provided in various commercially available light sources and color heads, such as the Besseler Color Computer Dichro 45 manufactured by Besseler Photo Marketing Co., Inc., Florham Park, N.J.

Referring to FIG. 1, a typical light source or color head 12 is shown. The dialable dichroic filters 14 in the light source provide a color with which the primary color is mixed. Alternatively, individual filters could be used for hue shift. FIG. 2 shows a filter matrix or bay 16 including a plurality of filter slots 17. The primary hue (yellow in this example) is determined by a sharp cutoff filter, such as a Kodak Wratten Gelatin Filter manufactured by Kodak Company, Rochester, N.Y. placed in a filter bay slot.

The value shift axis shifts the light density of the hue progressively from a lighter density to a darker density. In the matrix shown in FIG. 3, density is shifted along the vertical axis (hue is shifted along the horizontal axis in the example). The '0' value refers to the addition of no F stops of neutral density or normal, transparent density. Moving down the matrix, an F stop of neutral density is added at each row. A density value of 0.30 neutral density subtracts one F stop from the density of the medium through which the light source is supplied to a printing medium. Similarly, a neutral density of 0.60 subtracts two F stops and a neutral density of 0.90 subtracts three F stops to the density of the medium. Referring to FIG. 2, it can be seen that the filter bay includes a slot for adding neutral density filters in accordance with the color palette matrix.

A unique feature of the present invention is the incorporation of two "preflash" rows to the matrix of FIG. 3. The use of preflash extends the range of sharp cutoff filter density. Often, color density range is limited by the addition of a color correction factor (discussed below) before the actual filters for color generation are added. By adding preflash, color range is significantly extended and sharp cutoff filters may be used over a wider range of densities.

Preflash is created by double exposing unexposed transparency film with a white light through neutral density filters for one second at F8. The top row in FIG. 3 shows a neutral density filter value of 0.60 or two F stops; the second row in FIG. 3 shows a neutral density value of 0.90 or three F stops.

It can be seen by referring to FIG. 3 that density is progressively increased moving down the vertical axis of the color palette matrix and that color is progressively shifted from a primary color toward a second secondary color moving left to right on the horizontal axis of the color palette matrix. Referring to the color generation code of FIG. 4 it also can be seen that the primary color value (Y2), a color shift value (40M), and a preflash value (PF2) are specified. Additionally, the first position in the color generation code (1) indicates an exposure time of one second; the second position in the color generation code (8) indicates an aperture setting of F8. Based on the values in the color palette matrix, as illustrated in the color generation code, a color lab may generate any color represented in the color palette matrix.

In one embodiment of my invention, the systematic reference for color generation and color matching is provided as a series of six sheets of 35 mm slides, each sheet having 36 different color values arranged in rows and columns as shown in FIG. 3 and by which a primary color is shifted toward a secondary color. Each sheet corresponds to the slide palette matrix shown in FIG. 3.

Each primary color is shifted toward two secondary colors. Thus, yellow is shifted with cyan toward green and with magenta toward red. Six sheets of 36 colors produce a systematic color reference of 216 colors. In another embodiment of the present invention, the same technique is used to provide a gray scale shift of 6 shades of gray for black and white graphic transparencies.

A complete systematic color reference may be produced from the information provided in the slide palette matrix. A slide having a color corresponding to each location in the matrix is printed on a suitable printing stock, for example, Kodak Ektachrome 5071 manufactured by the Kodak Company, Rochester, N.Y. Because such duplicating stock is not color balanced for the particular production equipment used in each processing lab, the first step in producing the systematic color reference is to color balance the duplicating stock. Such color balancing or color correction is accomplished by using individual correction filters such as the Kodak Color Printing Gelatin filters discussed above. Filter bay 16 (FIG. 2) includes a slot for adding color correction filters.

To generate a particular color from the color palette matrix, a light source or color head having dialable dichroic filters is adjusted according to the color generation code of FIG. 4. Appropriate filters are added to the slots of filter bay 16. The color combination thus produced is provided to a camera or optical printer, (not shown) such as the Sickles Optical Printer, model 4200, manufacturered by Sickles Industries, Tempe, Ariz. The printer or camera exposure time and aperture are set according to the color generation code (1 second at F8) and the printing stock is exposed according to the color generation code.

The present system is intended to provide a standardized and systematic color reference. Thus, an exposure time of one second and an aperture setting of F8 is specified. Any other such values may be used as are appropriate for the equipment, environment, and medium with which the systematic color reference is used.

In use, a color lab or designer uses the color palette matrix to select a color to be generated or to select a color to match an existing color. If the desired color was an exact match for a standard color in the matrix, the value for that color is set into the light source and the color is thus produced. If the desired color is between two colors on the matrix, the color is generated or matched by interpolation. For example, if the density of the color is between two established matrix values, the density value is increased or decreased to shift the standard matrix density toward the desired density. In a similar matter, if the color shift value is between two established matrix hues, the value of the hue that the primary color is shifted toward is increased or decreased to shift the standard matrix color toward the desired color. Once the desired values are established, printing of specific transparencies may proceed.

An important feature of the present invention is the speed with which a color may be selected or at least approximated. In a busy processing laboratory, it is only necessary to scan through six sheets of slide palette matrices to quickly locate the desired color, and the value necessary to produce it.

There is some variation between equipment and light sources, as well as among standard printing stocks used by various laboratories. In practicing my invention, it is advisable to generate an entire set of color palette matrices according to the disclosed process so that the color reference accurately reflects those colors generated by the equipment used in the laboratory.

In another embodiment of my invention the standard exposure time of one second at an aperture setting of F8 may be achieved by limiting the amount of light from the light source with neutral density filter gels placed in the light source path inside the light source head or filter tray. In this way, the need to constantly change the exposure time and aperture settings for various optical printers or cameras is eliminated. Thus, the light source is always at a proper exposure value without regard to printing equipment used.

Another unique aspect of my invention is the provision for overprinting colors. In a color palette matrix, a test pattern or logo may be included as part of each reference color slide. In one embodiment of my invention, six colors—green, yellow, orange, red, magenta, and cyan—and white are double exposed through standard gels onto a particular background color (FIG. 5). By providing overprinted colors, color interaction and color contrast is readily seen. In this way, a designer can decide on color values for text and art in view of chosen background. Over-printing colors also allows the designer to determine if a particular background is not suitable for certain display materials. For example, if a designer is working with a company logo that has a distinctive color, a particular background color may wash out the logo or clash with it. By reviewing the effect of a background color in the color palette matrix on one of the six over-printed colors, the artist can readily determine before printing whether the color is satisfactory.

The foregoing was given by way of illustration and example. It is to be understood that the scope of the present invention should be limited only by the breadth of the following claims.

I claim:

1. In an optical printing system including a light source, a filter bay, and an optical printer for exposing graphic transparencies, a systematic reference for standardized color generation and matching, comprising:
   a color palette matrix including a plurality of reference transparencies arranged in rows and columns;
   said matrix having a hue shift axis wherein hue is progressively shifted from a primary color toward a secondary color by color filters;
   said matrix having a value shift axis wherein light density of the hue is progressively shifted from a lighter density to a darker density by neutral density filters; and
   each matrix location having a designation from which its hue axis and value shift axis values may be determined according to the code:

AB CD xxE, wherein:
   A = transparency exposure time,
   B = optical printer aperture setting,
   C = primary color filter color,
   D = value of neutral density filter,
   xx = amount of hue shift, and
   E = second primary color with which the primary color is mixed to shift the hue toward the secondary color.

2. The systematic reference of claim 1, wherein hue shift is effected by dialable dichroic filters within said light source.

3. The systematic reference of claim 2, wherein said first primary color is established by a gelatin color filter in said filter bay.

4. The systematic reference of claim 1, further comprising a grey scale matrix for reproducing and matching shades of grey.

5. The systematic reference of claim 1, wherein said primary colors comprise yellow, cyan, and magenta.

6. The systematic reference of claim 1, wherein said primary colors comprise red, blue, and green.

7. The systematic reference of claim 1, wherein each matrix location includes a plurality of over-printed colors for color contrast and interaction determination.

8. The systematic reference of claim 1, further comprising a plurality of color palette matrices.

9. The systematic reference of claim 8, further comprising six color palette matrices having 36 colors each, said systematic reference providing a selection of 216 colors.

10. The systematic reference of claim 1, wherein said code further comprises the terms:

pfG, wherein:
    pf = pre-flash for extending the range of color filter density, and
    G = pre-flash value.

* * * * *